P. G. Meek.
Printer's Galley.
N° 71200. Patented Nov. 19, 1867.

Witnesses:
Thos Hollingshead
John D. Bloor

Inventor:
P. G. Meek
by Hammond & Hollingshead

United States Patent Office.

P. GRAY MEEK, OF BELLEFONTE, PENNSYLVANIA.

Letters Patent No. 71,200, dated November 19, 1867.

IMPROVEMENT IN PRINTERS' GALLEYS.

*The Schedule referred to in these Letters Patent and making part of the same.*

TO ALL WHOM IT MAY CONCERN:

Be it known that I, P. GRAY MEEK, of Bellefonte, Centre county, Pennsylvania, have invented certain new and useful Improvements in Printers' Galley; and I do hereby declare that the following is a full, clear, and exact description of the same, reference being had to the annexed drawings, and the letters of reference marked thereon, making part of this specification, in which—

Figure 1:
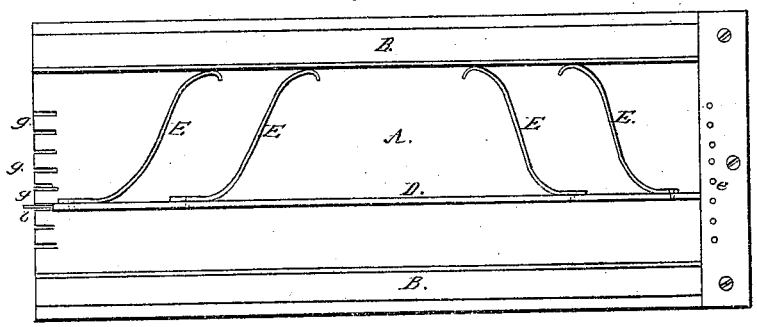
Figure 2:
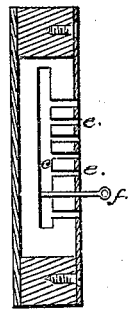
Figure 3:
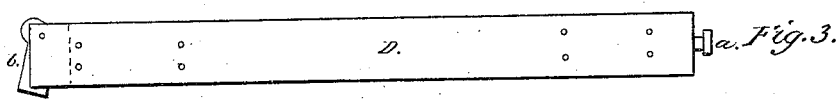
Figure 4:
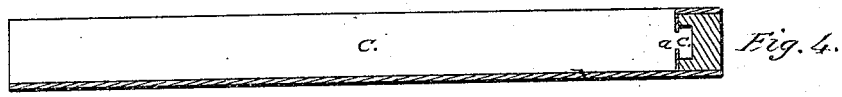
Figure 5:
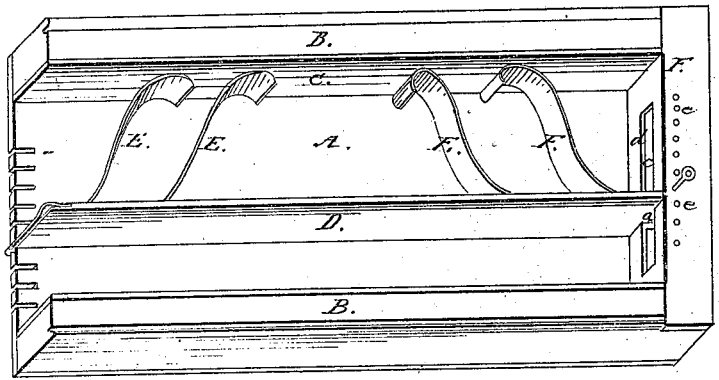

Figure 1 is a top view.
Figure 2 is a sectional view of the head of the galley.
Figure 3 is the side-stick detached.
Figure 4 is a view of the side-stick as it works in the slots in the head of the galley.
Figure 5 is a perspective view.

My invention consists in applying to the side-stick of the ordinary printers' galley, a series of springs so arranged that while the stick is self-adjusting, at the same time the type can be tightly locked in the galley by the simple pressure of the springs upon the side-stick. One end of the series of springs is attached to the side-stick, and the other is left perfectly free, having its bearing against the side of the galley. The force of the springs is sufficient to drive the side-stick to a position of close proximity to the side of the galley which is opposite their point of bearing, and against which rests the type. Thus it will be observed that the side-stick is not only self-locking, firmly retaining the matter in the desired position, so that the galley can be handled in the most careless manner without the slightest danger of disarranging the type, but, at the same time, is so arranged as to readily accommodate itself to the matter, securely locking the same, whether it be a single line or a galley-full.

The great advantages of the arrangement above referred to, will readily suggest themselves to any one skilled in the art to which my invention is applicable. Among the most prominent, I would enumerate its cheapness, its simplicity, its entire practicability. It assists the compositor in emptying his "stick" squarely; it saves the galley from being bursted apart with quoins and wedges; in a word, in its entire efficiency, and the readiness with which it can be adapted and applied to all galleys now in use. The effective operation of the side-stick depending upon and being entirely controlled by the direct action of the springs, and the latter being securely attached to the former, the means are always at hand to immediately lock the type, whether the same extends the entire length of the galley or not. And the facility with which the matter or type, as well as the side-stick itself, can be removed from the galley, is much greater than with the old style of galley. Another important feature consists in the construction of the side-stick itself; one end of the stick being provided with a T-shaped head, which works in a slot at the end of the galley. While this T-shaped bearing prevents the side-stick from sliding lengthwise along the galley while in use, it at the same time allows the side-stick to be readily removed, simply by slightly turning the same. The face-plate attached to the head of the galley is furnished with a series of holes, through which a pin can be inserted, which, passing in front of the T-shaped head of the side-stick, will retain the same at any desired point. The other end of the side-stick is slotted. In this slot there is pivoted or hinged a blade or pawl. This blade or pawl, when turned down, engages in a series of notches or a ratchet-plate, arranged at the bottom or open end of the galley. These notches being directly opposite the holes in the face-plate of the head, allow of the side-stick being retained at any desired point between the sides of the galley, and parallel with the same.

To enable others skilled in the art to make and use my invention, I will proceed to describe its construction and operation.

The bottom A is a flat metal plate. To the bottom A, I firmly secure, by means of screws, the frame B. To this outer frame B, I attach an inner metal frame, C. D is the side-stick, one end of which is furnished with a T-shaped head, $a$. The other end of the side-stick is slotted. In this slot is pivoted or hinged a blade or pawl, $b$. E E are a series of springs. One end of these springs is attached to the side-stick D, while the other end of each is left perfectly free, having their bearings against the side of the inner frame C, as shown in fig. 1. This series of springs is shown as constructed of thin steel plate, and are four in number, but coil and other springs may be used, and the number may be greater or less than four, as occasion may require, care always being had to provide, for the ends of the side-stick, springs of greater power than that possessed by those which are to be attached at the intermediate points. The ends of both the outer and inner frame are slotted nearly their entire length; the width of the slot c in the outer frame B, being sufficiently large for the end of the T-shaped head of the side-stick D to work freely therein. To the head of the galley covering both the outer and inner frames B C, there is secured a face-plate, F. In this plate there is a series of holes, e. A pin, f, can be inserted in either of these holes, by means of which the end of the side-stick D can be retained at any desired point. In the bottom plate A, and directly opposite these holes e, is a series of notches, g. In these notches engages and works the blade or pawl b.

The operation is as follows: The side-stick D is forced back far enough to allow a bed between the same and the side of the galley for the free introduction of the desired type or matter, the pin f is inserted in the hole e immediately in front of the side-stick, and the blade or pawl b is thrown down and enters the corresponding slot g. By this means the side-stick is held perfectly stationary until the type is properly arranged on the bed. When the pin f is withdrawn and the blade b is "thrown up" the recoil of the springs then instantly forces the stick against the type, securely locking the same in position. They are thus held until it is desirable to remove the same, when the side-stick is again forced back, the pin inserted, and the blade b thrown down, as before described, and the type readily and squarely emptied. When it is desired to remove the side-stick, it can easily be done, simply by turning the same so as to bring the face of head a parallel with the upper and lower sides of the slot.

Having thus fully described my invention, what I claim therein as new, and desire to secure by Letters Patent, is—

1. A printer's galley constructed with a slot at one end, and a notched plate at the other, in combination with a side-stick having a T-shaped head and pawl, when the same is operated by means of spring, substantially as described.

2. Securing the type in position by means of the side-stick D, when the same is operated by springs, substantially as and for the purposes specified.

3. The combination of the T-shaped head a, plate F having holes e, and pins f, substantially as and for the purpose specified.

4. The bottom plate A having notches g, in combination with the blade or pawl b, arranged and working in a slot in the end of the side-stick D, substantially as described and for the purpose specified.

In testimony whereof I have signed my name to this specification in the presence of two subscribing witnesses.

P. GRAY MEEK.

Witnesses:
    Geo. W. Jackson,
    Isaac Mitchell.